(12) United States Patent
Matsuzawa

(10) Patent No.: US 11,990,153 B2
(45) Date of Patent: May 21, 2024

(54) MAGNETIC DISK DRIVE AND METHOD OF SETTING A NOTCH FILTER OF THE DRIVE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Takuji Matsuzawa, Kashiwa Chiba (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 18/184,567

(22) Filed: Mar. 15, 2023

(65) Prior Publication Data
US 2024/0112699 A1    Apr. 4, 2024

(30) Foreign Application Priority Data
Sep. 26, 2022  (JP) .................. 2022-152352

(51) Int. Cl.
G11B 20/10    (2006.01)
G11B 5/596    (2006.01)
G11B 19/20    (2006.01)

(52) U.S. Cl.
CPC .......... *G11B 19/20* (2013.01); *G11B 5/59622* (2013.01)

(58) Field of Classification Search
CPC ........... G11B 27/36; G11B 5/09; G11B 20/10; G11B 20/0013; G11B 20/10046; G11B 5/02; G11B 20/10027; G11B 5/035
USPC .................. 360/65, 75, 31, 77.02, 78.04
See application file for complete search history.

(56) References Cited

U.S. PATENT DOCUMENTS

| | | |
|---|---|---|
| 6,996,592 B2 | 2/2006 | Ikai |
| 7,023,646 B2 | 4/2006 | Bahirat |
| 9,047,900 B2 * | 6/2015 | Goker .............. G11B 20/10046 |

FOREIGN PATENT DOCUMENTS

JP    2004-80141 A    3/2004

* cited by examiner

*Primary Examiner* — Nabil Z Hindi
(74) *Attorney, Agent, or Firm* — Knobbe, Martens, Olson & Bear, LLP

(57) ABSTRACT

According to one embodiment, a magnetic disk drive includes a notch filter, a parameter storage unit and a computation unit, when the sampling period changes from a first sampling period to a second sampling period, the computation unit computes a damping ratio parameter related to the damping ratio in a second set of parameters at the second sampling period, based on a first absolute value at a first angular frequency of a first transfer function computed from a first set of parameters at the first sampling period and a second absolute value at the first angular frequency of a second transfer function computed from the first set of parameters at the second sampling period, and the notch filter is set with the second set of parameters at the second sampling period is computed.

16 Claims, 6 Drawing Sheets

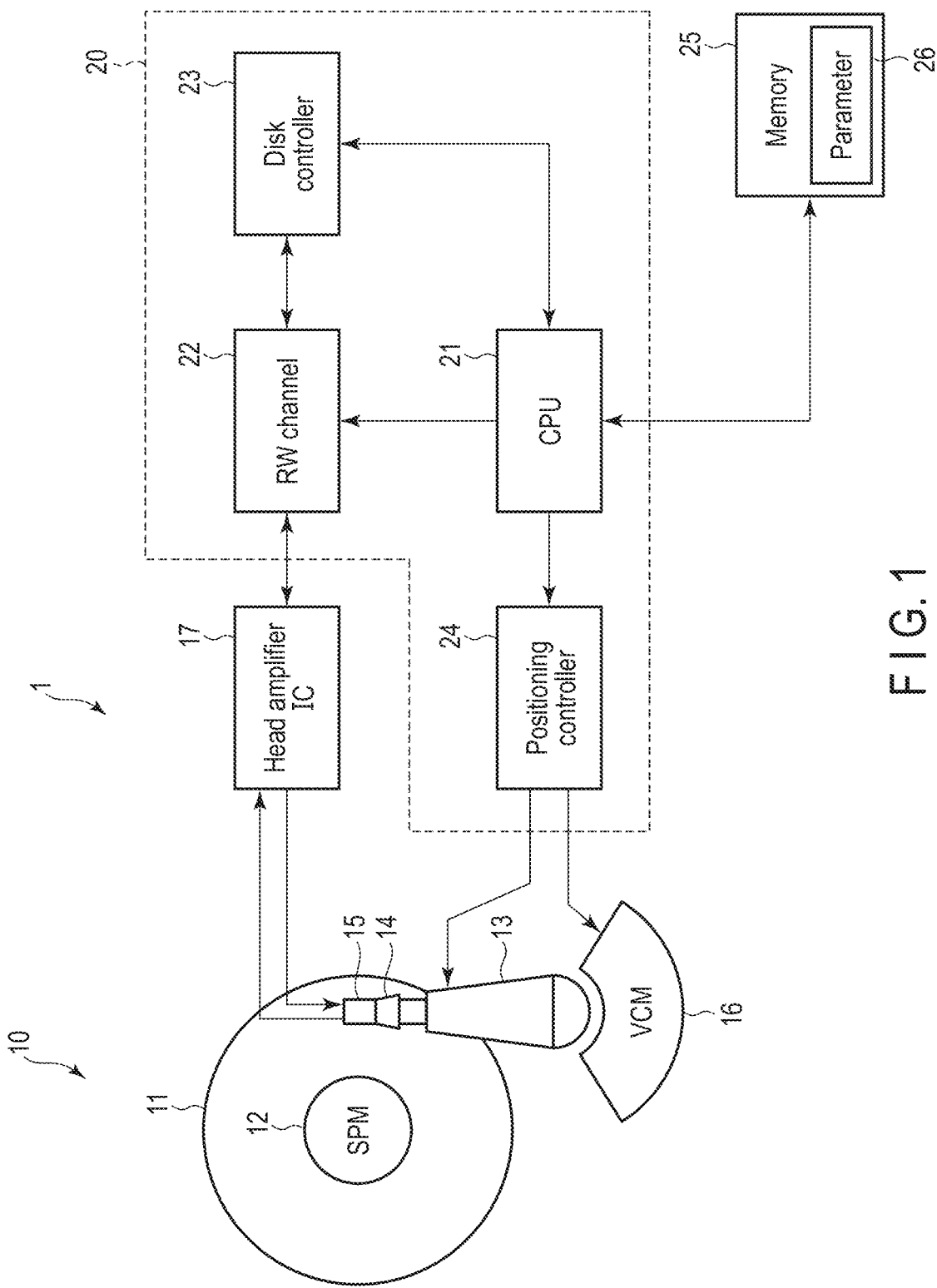
F I G. 1

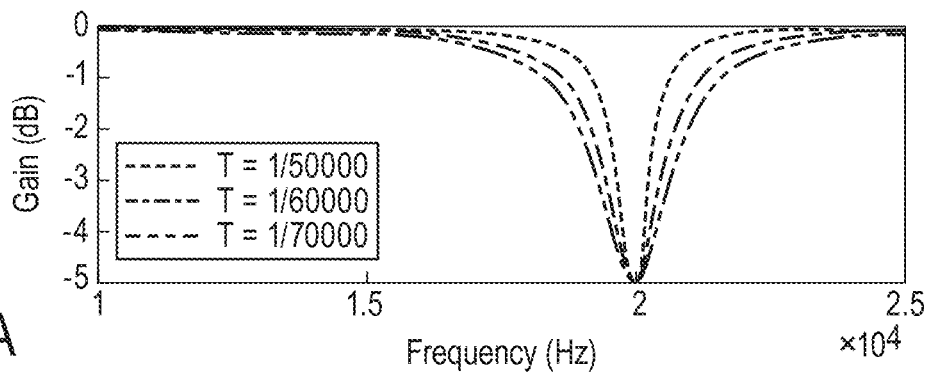
F I G. 4A
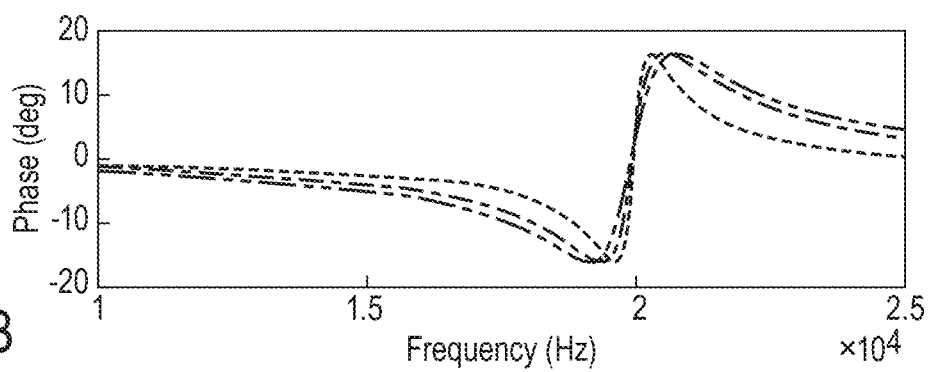
F I G. 4B
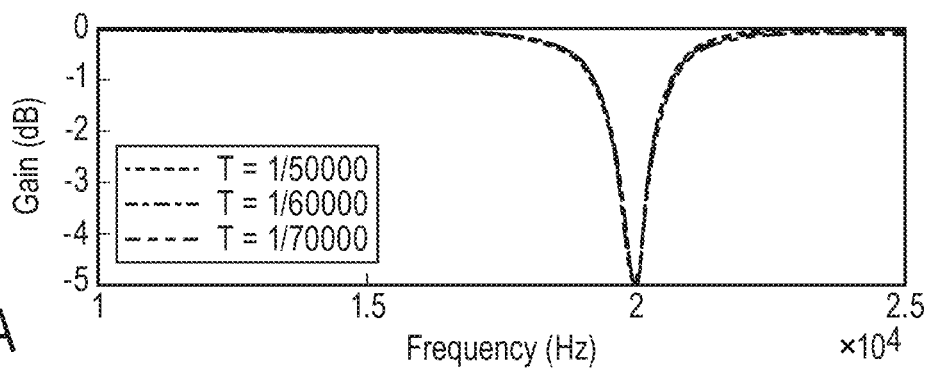
F I G. 5A
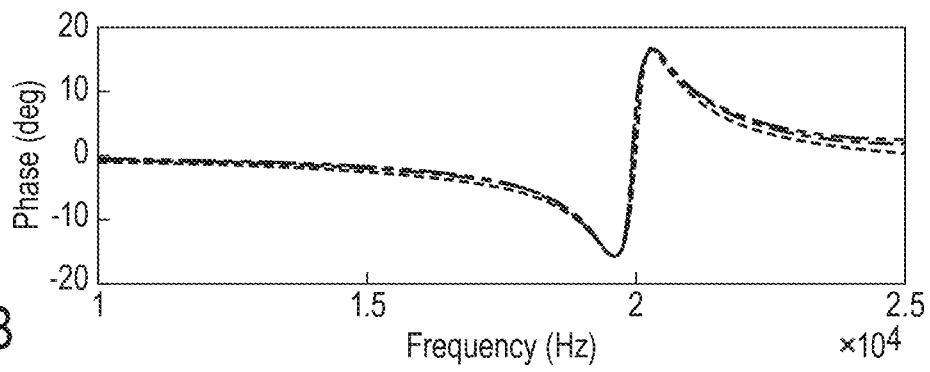
F I G. 5B

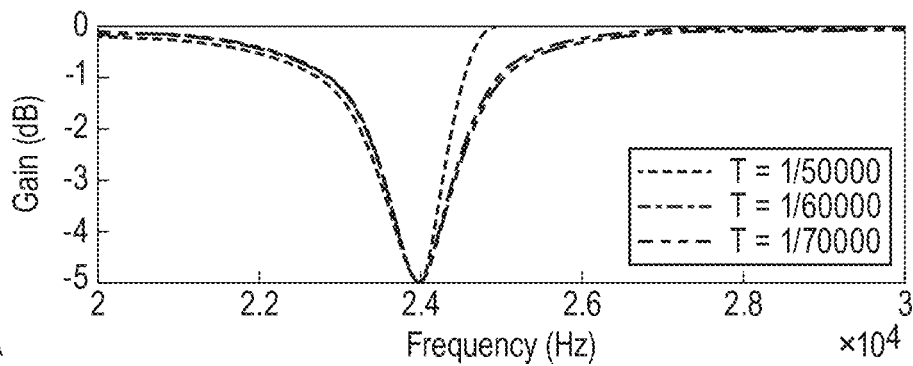
F I G. 6A
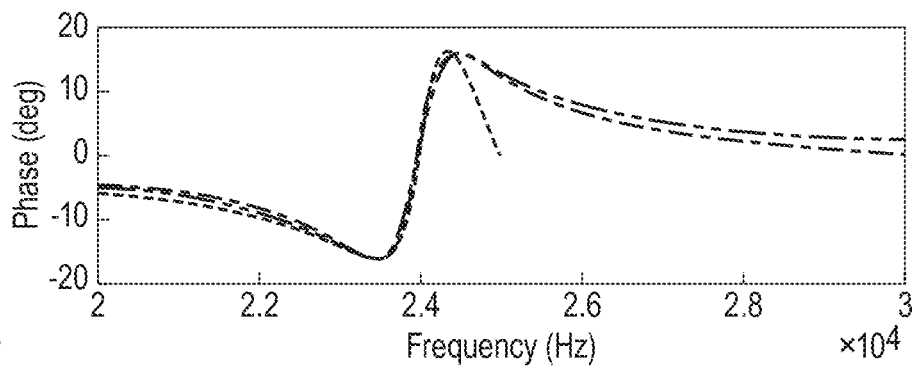
F I G. 6B
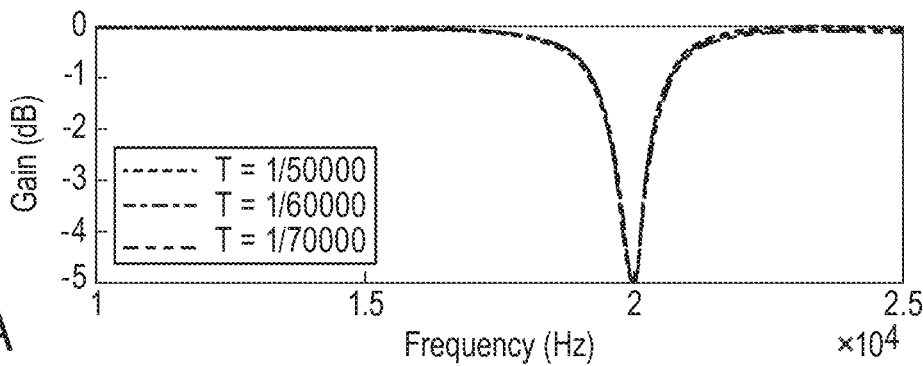
F I G. 7A
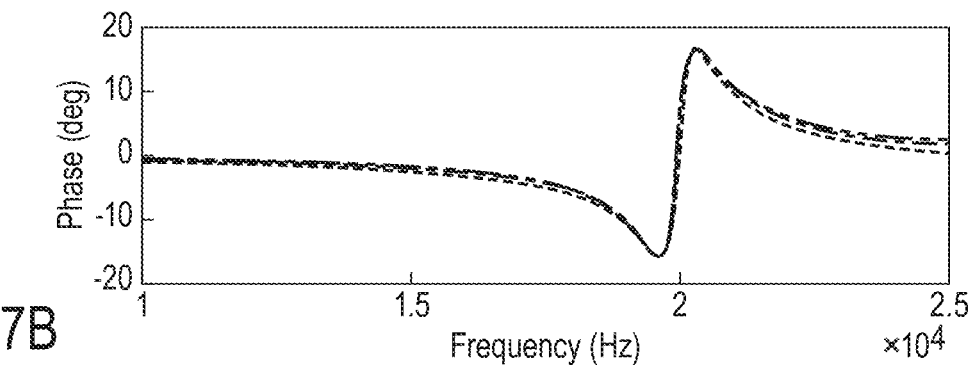
F I G. 7B

MAGNETIC DISK DRIVE AND METHOD OF SETTING A NOTCH FILTER OF THE DRIVE

CROSS-REFERENCE TO RELATED APPLICATIONS

This application is based upon and claims the benefit of priority from Japanese Patent Application No. 2022-152352, filed Sep. 26, 2022, the entire contents of which are incorporated herein by reference.

FIELD

Embodiments described herein relate generally to a magnetic disk drive and a method of setting a notch filter of the drive.

BACKGROUND

In a magnetic disk drive mounted on a server or the like, the rotation speed of a magnetic disk may be changed. In this case, the sampling period of positional information recorded on the magnetic disk changes according to the rotation speed of the magnetic disk. In a prior art magnetic disk drive, even if a sampling period changes, the parameters, filter coefficient of a controller that controls positioning of a magnetic head is not changed. In the controller, therefore, the frequency characteristics of a notch filter, which suppresses mechanical resonance of an actuator, are changed from desired one, which adversely affects the accuracy of positioning control of the magnetic head.

Embodiments described herein aim to provide a magnetic disk drive that is capable of maintaining the frequency characteristics of a notch filter satisfactorily and contributing to improving the accuracy of positioning control of a magnetic head even though the sampling period of positional information changes, and a method of setting the notch filter.

BRIEF DESCRIPTION OF THE DRAWINGS

FIG. 1 is a block diagram showing an example of a configuration of a magnetic disk drive according to an embodiment.

FIGS. 4A and 4B are diagrams each showing frequency characteristics in the case where no damping ratio parameters are changed in response to a change in sampling period in the notch filter setting process of the embodiment.

FIGS. 5A and 5B are diagrams each showing frequency characteristics in the case where damping ratio parameters are changed in response to a change in sampling period in the notch filter setting process of the embodiment.

FIGS. 6A and 6B are diagrams each showing how a deviation occurs in the notch filter setting process of the embodiment when the angular frequency of the notch filter is close to the Nyquist frequency.

FIGS. 7A and 7B are diagrams each showing frequency characteristics in a setting process of example 2 for the notch filter of the embodiment.

DETAILED DESCRIPTION

Figure 2:
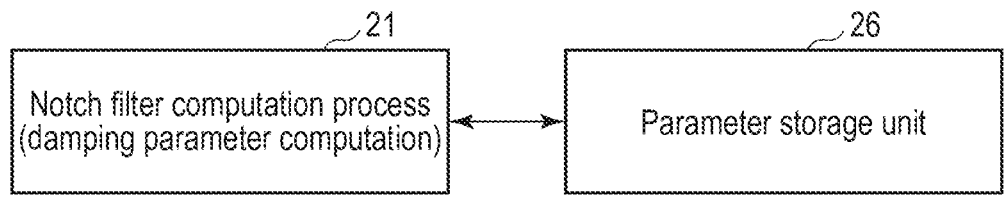
FIG. 2 is a block diagram showing a configuration for a process of setting a notch filter of the magnetic disk drive according to the embodiment.

Embodiments will be described hereinafter with reference to the accompanying drawings.

In general, according to one embodiment, a magnetic disk drive in which a sampling period of positional information recorded on a magnetic disk changes according to a rotation speed of the magnetic disk includes a notch filter provided in a controller which controls positioning of the magnetic head to suppress a specific angular frequency by setting a set of parameters related to at least a suppression angular frequency, a damping ratio and a depth in consideration of the sampling period; a parameter storage unit which stores a set of parameters of the notch filter and a first sampling period assumed when the first set of parameters is designed; and a computation unit that computes a discrete-time system transfer function from the sampling period and the set of parameters using a continuous-time system transfer function and a bilinear transform, wherein: when the sampling period changes from the first sampling period to a second sampling period, the computation unit computes a damping ratio parameter related to the damping ratio in a second set of parameters at the second sampling period, based on a first absolute value at a first angular frequency of a first transfer function computed from the first set of parameters at the first sampling period and a second absolute value at the first angular frequency of a second transfer function computed from the first set of parameters at the second sampling period; and the notch filter is set with the second set of parameters at the second sampling period is computed.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a block diagram showing an example of a configuration of a magnetic disk drive 1.

The magnetic disk drive 1 includes a head disk assembly (HDA) 10, a head amplifier integrated circuit (hereafter referred to as a head amplifier IC) 17 and a system on chip (SOC) 20.

The HDA 10 includes a magnetic disk 11, a spindle motor (SPM) 12, an arm 13 and a voice coil motor (VCM) 16. The magnetic disk 11 is rotated by the SPM 12. A load beam 14 is attached to the tip of the arm 13, and a magnetic head 15 is attached to the tip of the load beam 14. The VCM 16 is driven to cause the arm 13 to move the magnetic head 15 to a specific position on the magnetic disk 11.

The magnetic head 15 is so configured that a read head element and a write head element are separately mounted on a single slider. The read head element reads data out of the magnetic disk 11. The write head element writes data to the magnetic disk 11.

The head amplifier IC 17 includes a read amplifier and a write driver. The read amplifier amplifies a read signal read out by the read head element and transmits the amplified read signal to a read/write (R/W) channel 22. The write driver transmits a write current, which corresponds to write data output from the R/W channel 22, to the write head element.

The SOC 20 includes a microprocessor (CPU) 21, the R/W channel 22, a disk controller 23 and a positioning controller 24. The CPU 21 is a main controller of drive to perform servo control for positioning the magnetic head 15 via the positioning controller 24 and to perform data read/write control via the head amplifier IC 17. The R/W channel 22 includes a read channel for signal processing of read data and a write channel for signal processing of write data. The disk controller 23 performs interface control to control data transfer between a host system (not shown) and the R/W channel 22. Note that the positioning controller 24 may be implemented as hardware or software (firmware).

A memory 25 includes a volatile memory and a nonvolatile memory. The memory 25 includes, for example, a buffer memory including DRAMs and a flash memory. The nonvolatile memory of the memory 25 includes a storage unit (not shown) that stores, for example, programs necessary for processing by the CPU 21 and a parameter storage unit 26 that stores parameters when a parameter setting process described later is performed.

In the present embodiment, the memory 25 stores programs for setting a notch filter, and the parameter storage unit 26 stores parameters required to set and execute the notch filter. Note that the parameter storage unit 26 has only to be stored in any storage area in the magnetic disk drive 1, not in the memory 25.

Figure 3:
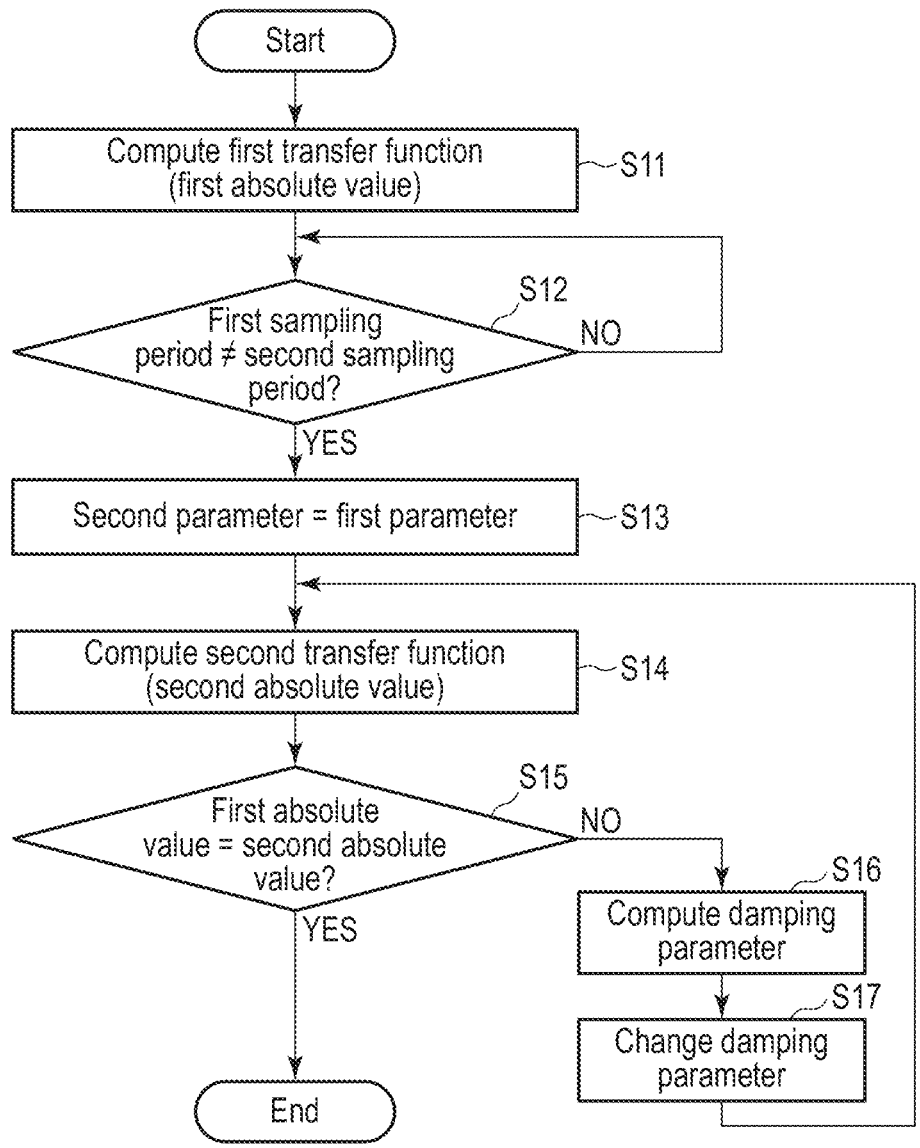
FIG. 3 is a flowchart showing a main flow of the process of setting a notch filter of the magnetic disk drive according to the embodiment.

The notch filter setting process will be described with reference to FIGS. 2 and 3. FIG. 2 shows a configuration in which processing programs for setting a notch filter stored in the memory 25 are loaded into the CPU 21 and parameters are read from and written to the parameter storage unit 26 included in the memory 25. FIG. 3 is a flowchart showing a flow of the notch filter setting process.

In the design of notch filters in magnetic disk drives, sets of parameters may be designed on the basis of continuous-time system transfer functions to obtain desired frequency characteristics of discrete-time transfer functions from a broad perspective of the design. Several methods are known for the discretization, but in the present embodiment, a bilinear transform (Tustin transform) is used for the discretization in consideration of frequency characteristics, computational efficiency, and the like.

First, as shown in FIG. 3, a first transfer function including a first absolute value at a first angular frequency during the initial sampling period (first sampling period) and at a first set of parameters is computed (step S11). Then, the sampling period is monitored to determine whether the first sampling period has changed to a second sampling period (step S12). If the first sampling period has changed to the second sampling period, the first set of parameters is set as a second set of parameters (step S13). Then, a second transfer function including a second absolute value at the first angular frequency during the second sampling period and at the second set of parameters is computed (step S14). The first and second absolute values are compared with each other to determine whether they coincide with each other (step S15). If they do not coincide with each other, a damping ratio parameter related to the damping ratio of the second set of parameters is computed (step S16), the damping ratio parameter of the second set of parameters is changed (step S17), and the second transfer function in step S13 is computed again. If the first and second absolute values coincide with each other in step S15, the notch filter setting process is terminated.

That is, in the present embodiment, when the sampling period becomes the second sampling period other than the first sampling period, the damping ratio parameter in the first set of parameters is changed into the second set of parameters such that the first absolute value at the first angular frequency of the first transfer function computed from the first sampling period and the first set of parameters becomes the same as the second absolute value at the first angular frequency of the second transfer function computed from the second sampling period and the second set of parameters. Assume here that the first transfer function is a continuous-time system transfer function computed from the first set of parameters if the first sampling period is 0.

In the bilinear transform (Tustin transform), first, the parameters $\omega_n$, $\zeta$, $d_p$ ($\omega_n$: suppression angular frequency, $\zeta$: damping ratio, $d_p$: depth) of the continuous-time system transfer function of the notch filter expressed by the equation (1) are so determined to obtain desired characteristics in a sampling period T.

$$N(s) = \frac{s^2 + 2d_p\zeta\omega_n s + \omega_n^2}{s^2 + 2\zeta\omega_n s + \omega_n^2} \quad (1)$$

Then, in consideration of frequency distortion due to the bilinear transform (Tustin transform), a suppression angular frequency $\omega_{nT}$ after "prewarp" is obtained by the equation (2) and is converted from an s domain to a z domain by the equation (3)

$$\omega_{nT} = \frac{2}{T}\tan\left(\frac{\omega_n T}{2}\right) = \frac{2}{T}\bar{\omega}_{nT} \quad (2)$$

$$s = \frac{2(z-1)}{T(z+1)} \quad (3)$$

The transfer function N[z, T] of a discrete-time notch filter obtained by the above transform is given by the equation (4).

$$N[z, T] = \frac{(1 + 2d_p\zeta\bar{\omega}_{nT} + \bar{\omega}_{nT}^2)z^2 + 2(\bar{\omega}_{nT}^2 - 1)z + 1 - 2d_p\zeta\bar{\omega}_{nT} + \bar{\omega}_{nT}^2}{(1 + 2\zeta\bar{\omega}_{nT} + \bar{\omega}_{nT}^2)z^2 + 2(\bar{\omega}_{nT}^2 - 1)z + 1 - 2\zeta\bar{\omega}_{nT} + \bar{\omega}_{nT}^2} \quad (4)$$

If the coefficient of the first transfer function computed by the equation (4) using $T_1$ as the first sampling period and using $\omega_n$, $\zeta_1$ and $d_p$ as the first set of parameters, is used as it is at the second sampling period $T_2$ other than the first sampling period $T_1$, the suppression frequency deviates. Thus, the coefficient of the transfer function needs to be computed again each time the sampling period changes.

However, the frequency characteristics of the transfer function obtained by the equation (4) using $T_2$ as the second sampling period and using $\omega_n$, $\zeta_1$ and $d_p$ as the first set of parameters are gain characteristics shown in FIG. 4A and phase characteristics shown in FIG. 4B. Desired characteristics are not obtained, especially because the frequency width that suppresses a gain differs from the first frequency characteristics of the first transfer function.

Therefore, in the present embodiment, even though the sampling period changes, the damping ratio parameter $\zeta$ is changed by the sampling period such that the frequency characteristics are almost unchanged at the first angular frequency $\omega \neq \omega_n$. Specifically, the damping ratio parameter $\zeta_2$ of the second set of parameters is determined such that a first difference between the first absolute value of the first transfer function $N[z, T_1]$, which is obtained by the equation (4) using $T_1$ as the first sampling period and using $\omega_n$, $\zeta_1$ and $d_p$ as the first set of parameters, at the first angular frequency $\omega \neq \omega_n$ and the second absolute value of the second transfer function $N[z, T_2]$, which is obtained by the equation (4) using $T_2$ as the second sampling period and using $\omega_n$, $\zeta_2$ and $d_p$ as the second set of parameters, at the first angular frequency, is 0 when the first angular frequency is at one point and the sum of absolute values of first differences at the first angular frequency is minimized when the first angular frequency is at a plurality of points.

If there is another notch filter in the angular frequency range corresponding to the minimum depth (quantization level) in terms of implementation, for example, the angular frequency of the notch filter is set as the first angular frequency. If there is no other notch filter in the angular frequency range, an angular frequency corresponding to the minimum depth in terms of implementation is set.

An approximation may be used to compute the parameter $\zeta_2$ in accordance with the first angular frequency $\omega$ set in accordance with the angular frequency of another notch filter.

As another embodiment, when the first sampling period is 0, that is, when it is a continuous-time system, the first transfer function may be a continuous-time system transfer function as expressed by the equation (1), and the damping ratio parameter $\zeta$ may be changed by the sampling period such that the absolute value of the continuous-time system transfer function and the discrete-time system transfer function are the same at the first angular frequency.

According to the present embodiment, a notch filter with desired characteristics can always be obtained even though the sampling period changes, as shown as gain characteristics in FIG. 5A and as shown as phase characteristics in FIG. 5B. If, however, the suppression angular frequency $\omega_n$ of the notch filter is close to the Nyquist frequency, the frequency characteristics tend to be distorted particularly near the Nyquist frequency. Therefore, a deviation occurs even in the present embodiment, as shown as gain characteristics in FIG. 6A and as shown as phase characteristics in FIG. 6B. In this case, it is advisable to make the first angular frequency co smaller than co n in order to reduce the influence upon a lower frequency range.

Specific examples will be described below.

(1) Example 1

The relationship between the damping ratio parameter $\zeta_1$ of the first set of parameters and the damping ratio parameter $\zeta_2$ of the second set of parameters at the first angular frequency $\omega$ of one point satisfying the equation (5) is given by the equation (6). When the first sampling period $T_1$ differs from the second sampling period $T_2$, the damping ratio parameter $\zeta_2$ of the second set of parameters obtained from the equation (6) and the second transfer function obtained from the equation (4) using $\omega_n$, $\zeta_2$ and $d_p$ and the second sampling period $T_2$ are set as a notch filter.

$$|N[e^{j\omega T_1}, T_1]| - |N[e^{j\omega T_2}, T_2]| = 0 \tag{5}$$

$$\zeta_2 = \frac{\Phi_2 \Psi_1}{\Phi_1 \Psi_2} \zeta_1 \tag{6}$$

$$\Phi_1 := \frac{\cos\omega T_1 - \cos\omega_n T_1}{1 + \cos\omega_n T_1}, \Phi_2 := \frac{\cos\omega T_2 - \cos\omega_n T_2}{1 + \cos\omega_n T_2},$$

$$\Psi_1 := \overline{\omega}_{nT_1} \sin\omega T_1, \Psi_2 := \overline{\omega}_{nT_2} \sin\omega T_2$$

(2) Example 2

When the first angular frequency $\omega$ of one point is near the suppression angular frequency $\omega_n$, the damping ratio parameter $\zeta_2$ of the second set of parameters expressed by the equation (6) is approximated by the equation (7).

$$\zeta_2 \approx \frac{(1 + \cos\omega_n T_1)\overline{\omega}_{nT_1} T_2}{(1 + \cos\omega_n T_2)\overline{\omega}_{nT_2} T_1} \zeta_1 \tag{7}$$

The frequency characteristics of the notch filter designed in this example when the sampling period T changes are shown as gain characteristics in FIG. 7A and shown as phase characteristics in FIG. 7B. In FIGS. 7A and 7B, $T_1$ is set equal to 1/50000 and $T_2$ is set equal to 1/60000 and 1/70000. It is seen from FIGS. 7A and 7B that desired characteristics are obtained even though the sampling period T changes.

(3) Example 3

The damping ratio parameter $\zeta_2$ of the second set of parameters expressed by the equation (6) is approximated by the equation (8).

$$\zeta_2 \approx \frac{\overline{\omega}_{nT_2} T_1}{\overline{\omega}_{nT_1} T_2} \zeta_1 \tag{8}$$

(4) Example 4

Figure 8:
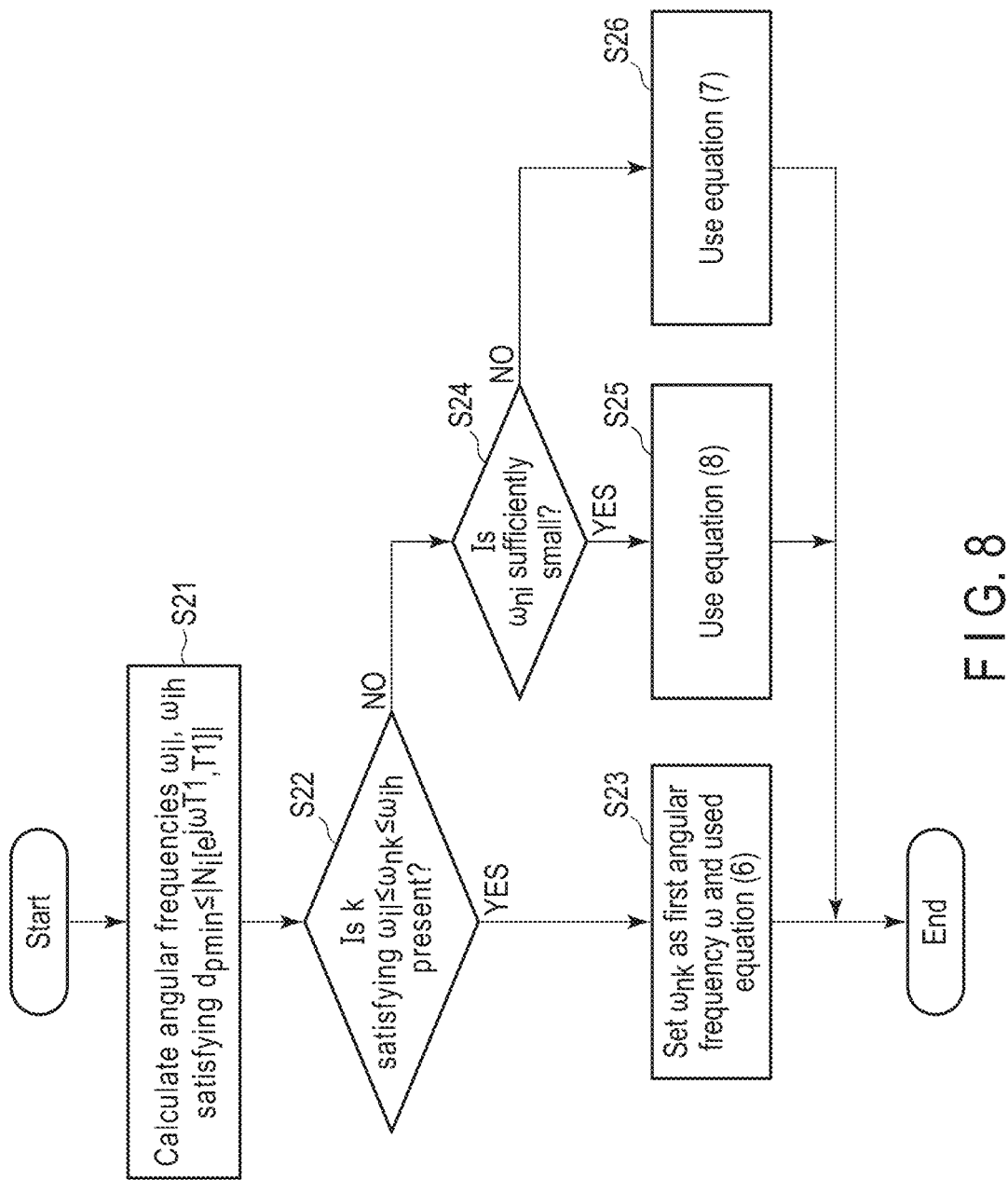
FIG. 8 is a flowchart showing a setting selection process in the case where a notch filter is provided at each of a plurality of stages in a setting process of example 4 for the notch filter of the magnetic disk drive according to the embodiment.

FIG. 8 is a flowchart showing a setting selection process in the case where a notch filter is provided at each of a plurality of stages in a notch filter setting process of example 4. More specifically, there is a notch filter at each of a plurality of stages, and angular frequencies $\omega_{il}$, $\omega_{ih}$ at which the minimum value $d_{pmin}$ of $d_p$ is equal to or smaller than $|N_i[e^{j\omega T_1}, T_1]|$ are calculated when the suppression angle frequency of the notch filter at each of the stages is set to $\omega_{ni}$ (i=1, 2, . . . ) (step S21).

Then, it is determined whether the suppression angular frequencies $\omega_{nk}$, $k \neq i$ ($\omega_{il} \leq \omega_{nk} \leq \omega_{ih}$) of notch filters at other stages are present within the frequency range in which the gain at the i-th stage is equal to or higher than a certain value (for example, the quantization level of parameter $d_p$ at the time of implementation) in the first sampling period $T_1$ (step 22). If they are present, the equation (6) is used with the first angular frequency $\omega$ as $\omega_{nk}$ (step S23).

If there are no notch filters at the other stages within the frequency range, it is determined that the suppression angle frequency $\omega_{ni}$ is sufficiently low (step S24). If it is low, the approximation of the equation (8) is used (step S25). If it is not sufficiently low, the approximation of the equation (7) is used (step S26). This allows desired characteristics to be obtained with a less computational effort.

(5) Example 5

At the first angular frequencies $\omega_1 \ldots, \omega_k$ of a plurality of points, when the sampling period is the second sampling period $T_2$ other than the first sampling period $T_1$, a second transfer function is set from the equation (4) using the damping ratio parameter $\zeta_2$ of the second set of parameters, which minimizes the equation (9), and $\omega_n$, $d_p$, and the second sampling period $T_2$ as notch filters.

$$\sum_{i=1}^{k} \left\| |N[e^{j\omega_i T}1, T_1]| - |N[e^{j\omega_i T}2, T_2]| \right\| \quad (9)$$

(6) Example 6

At the first angular frequency $\omega$ of one point, the relationship between the damping ratio parameters $\zeta_1$ and $\zeta_2$ of the first and second set of parameters, which satisfy the equation (10), is given by the equation (11). Thus, when discretized at the sampling period $T_2$, a second transfer function is set from the equation (4) using the damping ratio parameter $\zeta_2$ of the second set of parameters obtained from the equation (11) and $\omega_n$, $d_p$, and the sampling period $T_2$ as a notch filter.

$$|N(j\omega)| - |N[e^{j\omega T_2}, T_2]| = 0 \quad (10)$$

$$\zeta_2 = \frac{\Phi_2 Y}{\Omega \Psi_2} \zeta_1 \quad (11)$$

$$\Omega := \omega_n^2 - \omega^2, \Phi_2 := \frac{2(\cos \omega T_2 - \cos \omega_n T_2)}{1 + \cos \omega_n T_2},$$

$$Y := \omega_n \omega, \Psi_2 := \overline{\varphi}_{nT_2} \sin \omega T_2$$

$$\zeta_2 = \frac{\Phi_2 Y}{\Omega \Psi_2} \zeta_1$$

$$\Omega := \omega_n^2 - \omega^2, \Phi_2 := \frac{2(\cos \omega T_2 - \cos \omega_n T_2)}{1 + \cos \omega_n T_2},$$

$$Y := \omega_n \omega, \Psi_2 := \overline{\varphi}_{nT_2} \sin \omega T_2$$

(7) Example 7

When the first angular frequency $\omega$ of one point is near the suppression angular frequency $\omega_n$, the damping ratio parameter $\zeta_2$ of the second set of parameters expressed by the equation (11) is approximated by the equation (12).

$$\zeta_2 \approx \frac{\omega_n T_2}{(1 + \cos \omega_n T_2) \overline{\omega}_{nT_2}} \zeta_1 \quad (12)$$

Figure 9A:
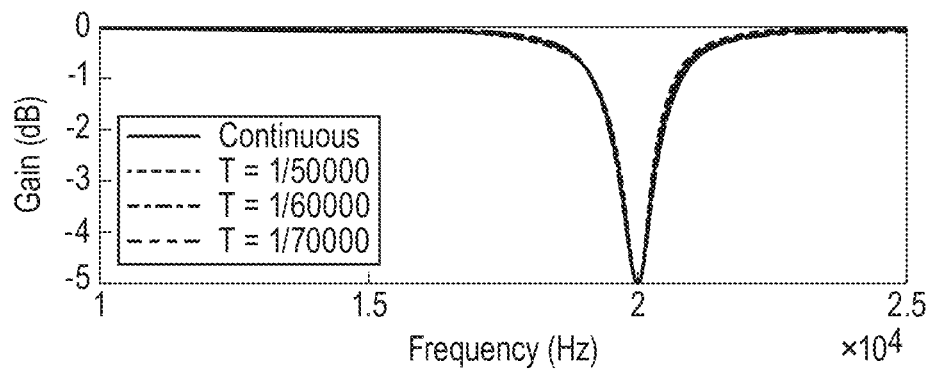
FIGS. 9A and 9B are diagrams each showing frequency characteristics in a setting process of example 7 for the notch filter of the magnetic disk drive according to the embodiment.
Figure 9B:
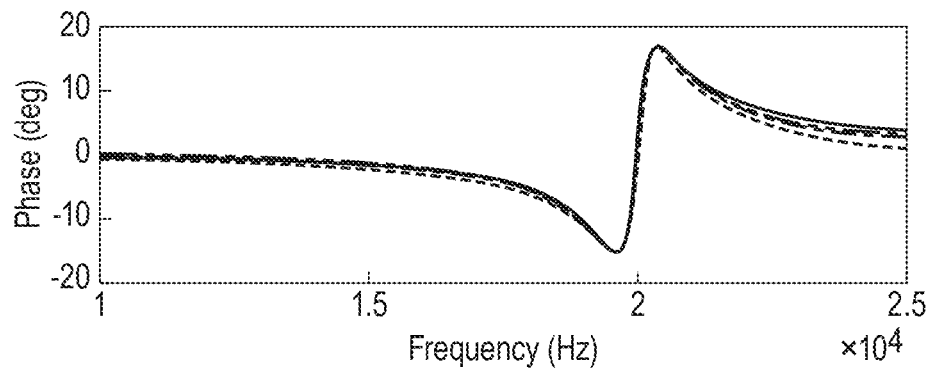

The frequency characteristics of the notch filter set in this example when discretized at the sampling period T are shown as gain characteristics in FIG. 9A and shown as phase characteristics in FIG. 9B. In FIGS. 9A and 9B, $T_2$ is set equal to 1/50000, 1/60000 and 1/70000. It is seen from FIGS. 9A and 9B that desired characteristics are obtained even though the sampling period T changes.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk drive in which a sampling period of positional information recorded on a magnetic disk changes according to a rotation speed of the magnetic disk, comprising:
   a notch filter provided in a controller which controls positioning of the magnetic head to suppress a specific angular frequency by setting a set of parameters related to at least a suppression angular frequency, a damping ratio and a depth in consideration of the sampling period;
   a parameter storage unit which stores a first set of parameters of the notch filter and a first sampling period assumed when the first set of parameters is designed; and
   a computation unit that computes a discrete-time system transfer function from the sampling period and the set of parameters using a continuous-time system transfer function and a bilinear transform,
   wherein:
   when the sampling period changes from the first sampling period to a second sampling period, the computation unit computes a damping ratio parameter related to the damping ratio in a second set of parameters at the second sampling period, based on a first absolute value at a first angular frequency of a first transfer function computed from the first set of parameters at the first sampling period and a second absolute value at the first angular frequency of a second transfer function computed from the first set of parameters at the second sampling period; and
   the notch filter is set with the second set of parameters at the second sampling period.

2. The magnetic disk drive of claim 1, wherein when the first sampling period is a continuous time, the first transfer function is a continuous-time system transfer function computed from the first set of parameters.

3. The magnetic disk drive of claim 1, wherein at a single first angular frequency, the computation unit computes the damping ratio parameter of the second set of parameters at the second sampling period such that a first difference between the first absolute value at the first angular frequency of the first transfer function and the second absolute value at the first angular frequency of the second transfer function becomes zero.

4. The magnetic disk drive of claim 1, wherein the computation unit computes the damping ratio parameter of the second set of parameters at the second sampling period by approximation.

5. The magnetic disk drive of claim 1, further comprising a computation selecting unit which is provided when the notch filter is configured by a plurality of stages to compute a damping ratio parameter based on a suppression angular frequency of the notch filter of each of the stages by selecting a computation equation,
wherein the computation selecting unit computes the damping ratio parameter by selecting a computation equation without approximation and a plurality of approximation equations, based on a judgement parameter which obtained and stored in advance in accordance with the suppression angular frequency of the notch filter.

6. The magnetic disk drive of claim 5, wherein:
the computation unit computes the damping ratio parameter of the second set of parameters at the second sampling period by approximation; and
the computation selecting unit has the judgement parameter for judging a case where the suppression angular frequency of the notch filter is sufficiently low, a case where a suppression angular frequency of another notch filter falls within a frequency range in which a gain of the notch filter prior to a change of the sampling period has a certain value or more, and other cases, and selects a computation equation for use in computing damping ratio parameter in accordance with the judgement parameter.

7. The magnetic disk drive of claim 1, wherein when the first angular frequency includes a plurality of first angular frequencies, the computation unit computes a damping ratio parameter of the second set of parameters at the second sampling period to minimize a sum of first absolute values of first differences between first absolute values at the first angular frequencies of the first transfer function and second absolute values at the first angular frequencies of the second transfer function.

8. The magnetic disk drive of claim 1, wherein when the notch filter includes a plurality of stages, the computation unit computes a damping ratio parameter related to the damping ratio of the second set of parameters at the second sampling period for each of the stages.

9. A method of setting a notch filter provided in a controller which controls positioning of a magnetic head of a magnetic disk drive in which a sampling period of positional information recorded on a magnetic disk changes, to suppress a specific angular frequency by setting a set of parameters related to at least a suppression angular frequency, a damping ratio and a depth in consideration of the sampling period, the method comprising:
computing a discrete-time system transfer function from the sampling period and the set of parameters using a continuous-time system transfer function and a bilinear transform;
when the sampling period changes from a first sampling period to a second sampling period, computing a damping ratio parameter related to the damping ratio in a second set of parameters at the second sampling period, based on a first absolute value at a first angular frequency of a first transfer function computed from a first set of parameters at the first sampling period and a second absolute value at the first angular frequency of a second transfer function computed from the first set of parameters at the second sampling period; and
setting, in the notch filter, the second set of parameters at the second sampling period.

10. The method of claim 9, wherein when the first sampling period is a continuous time, the first transfer function is a continuous-time system transfer function computed from the first set of parameters.

11. The method of claim 9, wherein at a single first angular frequency, the damping ratio parameter of the second set of parameters at the second sampling period is computed such that a first difference between the first absolute value at the first angular frequency of the first transfer function and the second absolute value at the first angular frequency of the second transfer function becomes zero.

12. The method of claim 9, wherein the damping ratio parameter of the second set of parameters at the second sampling period is computed by approximation.

13. The method of claim 9, further comprising computing a damping ratio parameter based on a suppression angular frequency of the notch filter of each of a plurality of stages by selecting a computation equation without approximation and a plurality of approximation equations, based on a judgement parameter obtained and stored in advance in accordance with the suppression angular frequency of the notch filter.

14. The method of claim 13, wherein:
the damping ratio parameter of the second set of parameters at the second sampling period is computed by approximation; and
a computation equation for use in computing damping ratio parameter is selected according to the judgement parameter for judging a case where the suppression angular frequency of the notch filter is sufficiently low, a case where a suppression angular frequency of another notch filter falls within a frequency range in which a gain of the notch filter prior to a change of the sampling period has a certain value or more, and other cases.

15. The method of claim 9, wherein when the first angular frequency includes a plurality of first angular frequencies, a damping ratio parameter of the second set of parameters at the second sampling period is computed to minimize a sum of first absolute values of first differences between first absolute values at the first angular frequencies of the first transfer function and second absolute values at the first angular frequencies of the second transfer function.

16. The method of claim 9, wherein when the notch filter includes a plurality of stages, a damping ratio parameter related to the damping ratio of the second set of parameters at the second sampling period is computed for each of the stages.

* * * * *